May 20, 1958     V. R. ABRAMS     2,835,003
METHOD AND APPARATUS FOR STERILIZING CONTAINERS
Filed April 14, 1955     2 Sheets-Sheet 1
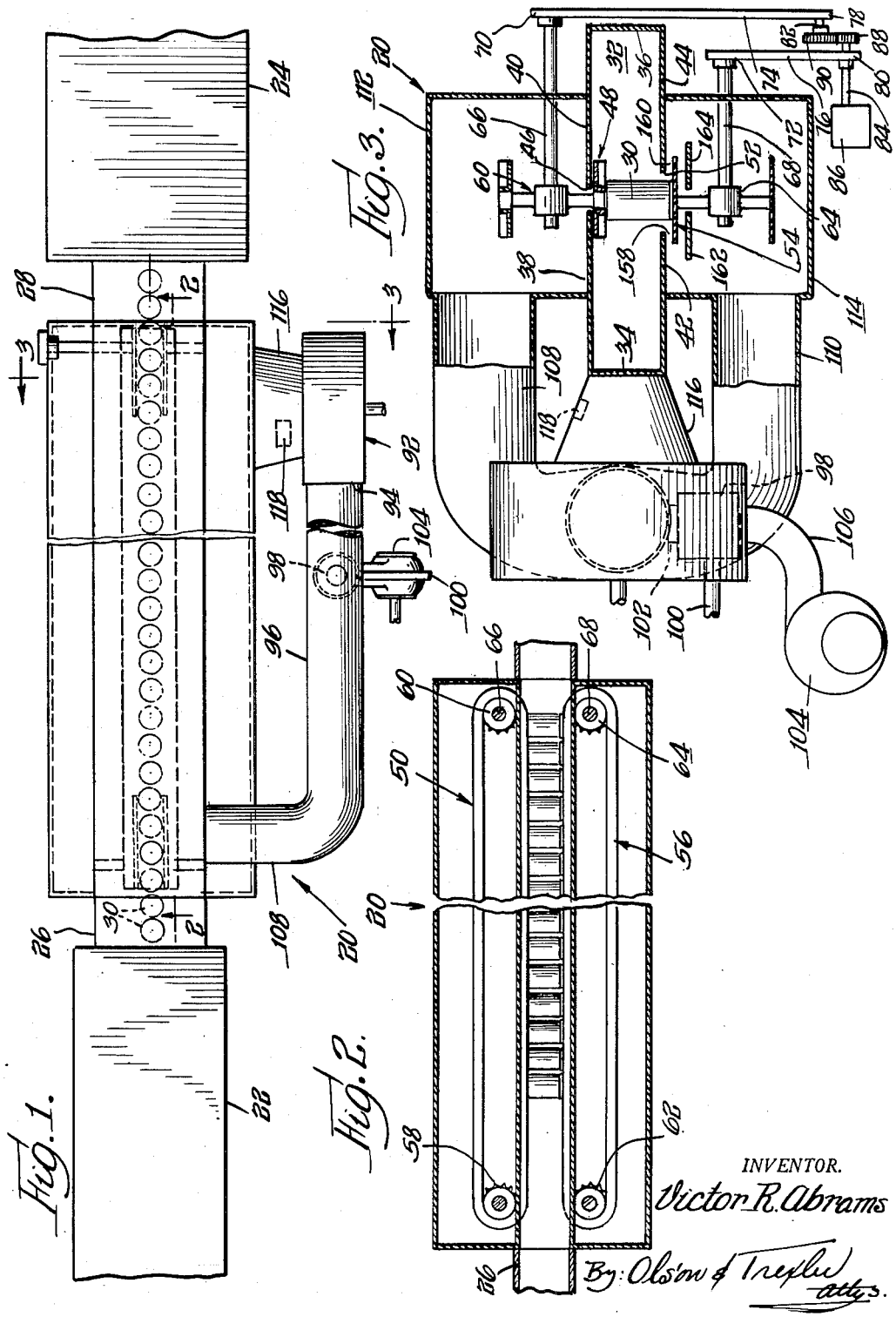
INVENTOR.
Victor R. Abrams
By Olson & Trexler
attys.

May 20, 1958 V. R. ABRAMS 2,835,003
METHOD AND APPARATUS FOR STERILIZING CONTAINERS
Filed April 14, 1955 2 Sheets-Sheet 2
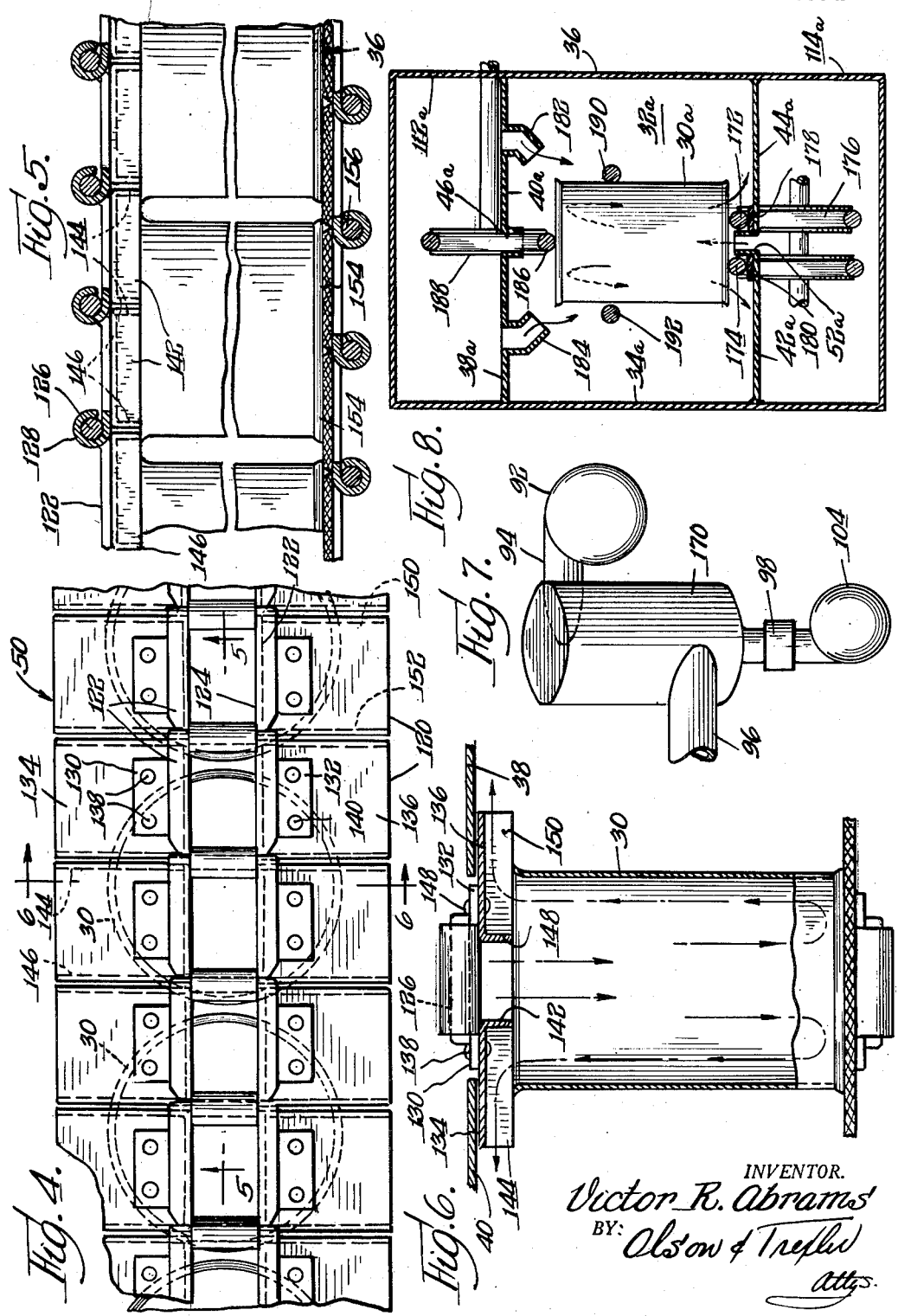
INVENTOR.
Victor R. Abrams
BY: Olson & Trexler
Attys.

United States Patent Office 2,835,003
Patented May 20, 1958

2,835,003
METHOD AND APPARATUS FOR STERILIZING CONTAINERS

Victor R. Abrams, Rockford, Ill.

Application April 14, 1955, Serial No. 501,390

15 Claims. (Cl. 21—78)

The present invention relates to a novel method and apparatus for heating and processing articles and more particularly, to a novel method and apparatus for heating and sterilizing containers such as cans and the like.

Containers which are to be used in an aseptic canning process have heretofore been sterilized in an apparatus which utilizes high temperature steam at super-atmospheric pressure. One disadvantage of such an apparatus is that it requires the use of valves through which the containers pass into the sterilizing chamber for maintaining the sterilizing chamber at super-atmospheric pressure. It has been proposed that this disadvantage may be overcome by introducing steam susbtantially at atmospheric pressure into a sterilizing chamber so that the valve may be eliminated, and at the same time, providing burners in the sterilizing chamber adjacent the containers for super-heating the steam to a high temperature and for heating the walls and parts of the apparatus within the sterilizing chamber. The use of such localized heating, while satisfactory for many purposes, may in some instances, result in uneven heating of the containers so that portions thereof may not be heated sufficiently for sterilization while other portions may be overheated and damaged. Furthermore, when such apparatus is used, it is necessary to maintain a flow of sterile gas such as saturated steam at atmospheric pressure through the sterilizing chamber to prevent the entry into the chamber of any contaminated air. It is, therefore, an object of the present invention to provide a novel apparatus for heating in a rapid and economical manner articles such as containers or cans for sterilizing the articles or for any other desired purpose, which apparatus is not subject to the disadvantages mentioned above.

More specifically, it is an important object of the present invention to provide a novel method and apparatus for heating containers or cans rapidly and uniformly to a predetermined temperature for sterilizing purposes without danger of localized overheating or underheating.

Another object of the present invention is to provide a novel apparatus for heating a series of moving articles or containers rapidly and uniformly by subjecting them to high velocity streams of heated gas while preventing the containers from being displaced by the energy of the gas streams.

Other objects and advantages of the present invention will become apparent from the following description and the accompanying drawings wherein:

Fig. 1 is a plan view of a portion of an aseptic canning line which includes the novel sterilizing apparatus of the present invention;

Fig. 2 is a fragmentary sectional view taken along line 2—2 in Fig. 1;

Fig. 3 is a fragmentary sectional view taken along line 3—3 in Fig. 1;

Fig. 4 is an enlarged fragmentary plan view of a portion of the container conveyor utilized in the apparatus of this invention;

Fig. 5 is a fragmentary sectional view taken along line 5—5 in Fig. 4;

Fig. 6 is a sectional view taken along line 6—6 in Fig. 4;

Fig. 7 is a fragmentary perspective view showing a modification which may be incorporated in the apparatus of Fig. 1; and Fig. 8 is a cross sectional view showing another modification which may be incorporated in the apparatus of Fig. 1.

Referring now more specifically to the drawings wherein like parts are designated by the same numerals throughout the various figures, a heating or sterilizing apparatus 20 embodying the principles of this invention is shown in Figs. 1, 2 and 3. When the apparatus 20 is to be used in an aseptic canning process, it may be disposed between a container washing apparatus 22 and container filling apparatus 24, which structures are diagrammatically shown in Fig. 1 and are respectively interconnected with the sterilizing apparatus by tunnels 26 and 28. As will be understood, a moving series of containers or cans 30 may be cleaned in the washing apparatus and then delivered to the sterilizing apparatus by suitable feeding means, not shown. The sterilized containers are then delivered to the filling apparatus while they are maintained in a sterile atmosphere. The containers are then filled under sterile conditions with the goods to be processed and advanced to a closing machine, not shown. While the sterilizing apparatus 20 is especially adapted to use in an aseptic canning process, it will become apparent that the sterilizing apparatus may be used to heat various articles for sterilization or for various other purposes.

The heating or sterilizing apparatus 20 of this invention includes an elongated tunnel or sterilizing chamber 32 having sheet metal side panels 34 and 36, sheet metal top panels 38 and 40, and sheet metal bottom panels 42 and 44. A longitudinally extending slot 46 is provided between the top panels 38 and 40, and a lower course 48 of endless conveying chain means 50 extends across this slot to complete the upper side of the sterilizing chamber. Similarly, an elongated slot 52 is provided between the bottom panels 42 and 44 and an upper course 54 of an endless conveyor chain 56 extends across this slot to complete the bottom of the sterilizing chamber.

As shown in Figs. 2 and 3, the endless chain means 50 is supported by rotatably mounted sprocket means 58 and 60, and the endless chain means 56 is supported by rotatably mounted sprocket means 62 and 64. The endless chain means 50 and 56 are driven in predetermined timed relationship at the same rate of speed by any suitable means. For example, as shown in Fig. 3, shafts 66 and 68 of the sprocket means 60 and 64, respectively, may extend outwardly and have sprockets 70 and 72 fixed thereto. Chains 74 and 76 are wrapped around the sprockets 70 and 72, respectively, and around sprockets 78 and 80 on rotatably mounted shafts 82 and 84. A motor 86 or any other suitable prime mover is provided for driving the shaft 84 and the shaft 82 is driven from the shaft 84 through meshing gears 88 and 90.

In accordance with an important feature of the present invention, the containers or cans 30 passing through the tunnel 32 are heated by subjecting them to a large mass of heated gas moving at a high velocity, which gas may be flue gas, air or super-heated steam or any other suitable gas. To accomplish this, the apparatus is provided with a high capacity blower which is adapted to be continuously driven by any suitable means such as an electric motor, not shown, and which has an outlet 94 connected with a duct 96. A burner 98 which is supplied with combustible gas through conduit 100 is connected with the duct 96 as at 102 so that the heated products of combustion mix with and heat the gas delivered by the blower 92. Combustion air is delivered to the burner by a blower 104 through a duct 106. The heated gases flow from the duct 96 into a bifurcated duct having leg portions 108 and 110, which, in turn, are respectively connected with relatively large manifolds 112 and 114. The gases pass from the manifolds into the sterilizing tunnel or chamber 32 in the manner described fully hereinbelow, and in order to obtain more economical operation, the gases are subsequently drawn from the tunnel 32 into the inlet of the blower 92 through a duct 116. Thus, the major portion of the gases is recirculated continuously through the sterilizing apparatus. The products of combustion and any excess combustion air from the burner 98 provide make-up gas to replace any gas escaping through the container inlet and outlet openings of the tunnel 32. Furthermore, the products of combustion and excess combustion air serve to provide a slight superatmospheric pressure within the sterilizing apparatus so as to prevent any contaminated air from leaking into the apparatus. The temperature of the gases circulating through the apparatus is controlled by adjusting the burner 98, and preferably, the burner is controlled by a thermostat 118 disposed in the outlet duct 116. This insures the maintenance of all the gases within the sterilizing chamber 32 above a predetermined desired temperature.

As shown best in Figs. 4, 5 and 6, the endless chain 50 includes a plurality of links 120. Each of the links includes a member 122 having a central aperture 124, a transversely extending pin-like marginal portion 126, and an opposed marginal portion 128 looped around the pin-like portion of an adjacent link member for pivotally connecting the links. Each link member 122 has a pair of oppositely extending wings 130 and 132 which are respectively connected with plate members 134 and 136 by a plurality of rivets 138 and 140 or any other suitable securing means. The plate member 134 has an inner margin terminating in a downwardly extending flange 142 and opposite laterally extending margins of the plate member 134 terminate in downwardly extending flanges 144 and 146. Similarly, the plate member 136 is provided with an inner downwardly extending flange 148 and longitudinally extending marginal flanges 150 and 152. As shown in Figs. 3 and 6, the plate members 134 and 136 closely underlie the top panels 38 and 40 of the sterilizing tunnel 32 so that the openings 124 in the link members 122 and the spaced inner marginal flanges 142 and 148 provide relatively restricted orifices through which the heated gases flow at high velocity from the manifold 112 and into the sterilizing chamber or tunnel 32. It should be noted that these orifices are located so that the heated gases will be directed downwardly into a central portion of the containers or cans 30 as shown by the arrows in Fig. 6. Since these orifices move with the cans through the apparatus it is seen that the heated gases will be directed into the cans continuously while the cans are passing through the sterilizing chamber so that efficient and thorough heating or sterilizing of the cans is promoted. It is also important to note that the flanges depending from the plate members 134 and 136 extend for engagement with the upper edges of the cans so as to prevent the cans from being displaced by the streams of heated gases. Furthermore, as shown best in Fig. 6, the depending flanges provide lateral passageways for permitting the gases to escape from the cans or containers. With this arrangement, the interior of the cans are continuously and completely flushed with the heated gases so that any possibility of contaminated air pockets remaining in the cans is eliminated.

The lower endless chain 56 is preferably constructed from a plurality of links 154 of foraminous material such as expanded metal, which links are connected by pins 156. Thus, the heated gases in the manifold 114 may flow through the foraminous links 154 into intimate contact with the containers or cans. Furthermore, as shown in Fig. 3, the course 54 of the endless chain 56 is preferably spaced slightly below the panels 42 and 44 of the sterilizing tunnel so as to provide relatively restricted elongated slot-like passageways 158 and 160 through which gases from the manifold 114 pass at high velocity into the tunnel 32 and into intimate contact with the containers or cans. In some instances, it may be desirable to provide baffle plates 162 and 164 which extend for substantially the full length of the slots 158 and 160 for directing a majority of the gases in the manifold 114 around the foraminous course 54 of the endless belt 56 and through the slots.

To initiate a sterilizing operation of the above described apparatus, the blowers and burner are started and heated gases are circulated throughout the apparatus for a sufficient period of time to flush any contaminated air therefrom. Of course, the thermostat 118 is set so that the burner will heat the gases in the duct 96 to the desired temperature, which temperature by way of example only, may be about 475° Fahrenheit. Furthermore, the blowers are operated at sufficient speed to deliver the desired amount of gases, which amount also by way of example only, may be about 12,000 cubic feet per minute. After the initial flushing of the apparatus has been done and the adjustments have been made, the containers to be sterilized are continuously introduced through the inlet tunnel 26 and between the endless chain courses 48 and 54 which, in effect, provide portions of the top and bottom of the sterilizing tunnel 32. The heated gases continuously flow from the manifolds 112 and 114 through the slots and orifices and impinge against the interior and exterior surfaces of the containers at very high velocities, which velocities also by way of example only, may be on the order of 6,000 feet per minute. It is important to note that by thus using a large mass of heated gas which is impinged against the containers at high velocities, high heat transfer is effected between the gas and the containers. Therefore, the mass of gas need be heated only a few degrees above the desired resultant container or can temperature so that very uniform over-all heating of the can will take place and a uniform final temperature of the can within a comparatively small temperature range will be obtained. In addition, the containers or cans will be heated to the desired temperature so that they may be advanced through the sterilizing chamber at a relatively high rate of speed. Rapid heating of the containers is further promoted by directing the gases from the burner into the manifolds adjacent the inlet end of the sterilizing tunnel so that the entering containers will be subjected to the highest temperature. It will be appreciated that as the gases flow through the sterilizing chamber and around the containers of cans, a temperature drop in the gases will occur. However, the apparatus is regulated so that the temperature of the spent gases flowing from the sterilizing chamber through the duct 116 to the blower 92 is still above the desired sterilizing temperature.

In Fig. 7 a slight modification of the above described apparatus is shown. In this modification the outlets of the blower 92 and the burner 98 are connected with a chamber 170 which, in turn, is connected with the duct 96. Furthermore, the outlet duct 94 and the duct 96 are connected tangentially with the chamber so that the gases flow through the chamber with a swirling motion. This causes an intimate mixing of the gases from the blower 92 and the products of combustion from the burner.

In Fig. 8 there is shown a modified form of the present invention in which elements corresponding to certain elements of the above described apparatus are designated by identical reference numerals with the suffix "a" added. More specifically, this embodiment of the apparatus includes an elongated heating or sterilizing chamber 32a and manifolds 112a and 114a which may be connected with the burner, ducts and blowers shown in Figs. 1 through 3. In this embodiment, the containers or cans 30a are advanced through the tunnel or chamber 32a in an inverted position or, in other words, with their open ends facing downwardly. The containers are supported on and advanced through the tunnel 32 by a pair of endless cables 172 and 174 which are wrapped around suitable pulley assemblies 176, only one of which is shown. Preferably, elongated wearing shoes 178 and 180 are provided for supporting the upper courses of the cables 172 and 174. Heated gases are continuously directed into the interiors of the containers from the manifold 114a through the centrally disposed elongated slot-like orifice 52a between the bottom panels 42a and 44a. Heated gases are also directed at high velocity against the upper ends of the containers through the elongated slot-like orifice 46a between the top panels 38a and 40a. In addition, nozzles means 182 and 184 are provided for directing the heated gases from the upper manifold 112a at high velocities against the sides of the containers. The containers are held down against the action of the high velocity gas stream flowing through the elongated slot 52a by an endless cable 186 which is wrapped around a pair of spaced pulley assemblies 188, only one of which is shown. As will be understood, the cables 178, 180 and 186 may be driven in predetermined timed relationship by means similar to the drive means shown in Fig. 3. The containers are held against lateral displacement by guide members 190 and 192 which may be fixed or which, if desired, may be in the form of driven endless cables similar to the endless cables described above. It will be appreciated that the process for sterilizing the containers or cans when utilizing the apparatus shown in Fig. 8 will be substantially identical to the process described above.

From the above description it is seen that the present invention has provided a novel method and apparatus whereby various articles or containers may be readily and relatively economically heated and sterilized. More specifically, it is seen that the present invention has provided a novel method and apparatus which utilize a large mass of heated gas moving at high velocities against the containers for rapidly and very uniformly heating the containers to the desired temperature. It will also be appreciated that since the gases may be heated to a temperature which is only slightly above the desired sterilizing temperature, any possibility of damage to the containers as a result of overheating is eliminated while still permitting the containers to be brought rapidly to the desired temperature.

While the preferred embodiments of the present invention have been shown and described herein, it is obvious that many structural details may be changed without departing from the spirit and scope of the appended claims.

The invention is claimed as follows:

1. An apparatus for heating articles such as containers and the like to a predetermined sterilizing temperature comprising means providing a chamber around an elongated path of travel, means in said chamber for simultaneously conveying a plurality of containers to be sterilized through said chamber and along said path of travel, manifold means of relatively large cross sectional area associated with said chamber, means for continuously supplying a large mass of heated gas into said manifold means, and means providing restricted orifice means of substantially less cross sectional area than said manifold means and disposed along a substantial length of said path of travel and communicating directly with said manifold means for directing heated gas at high velocity substantially continuously against containers while said containers are being conveyed along a substantial length of said path of travel.

2. An apparatus, as defined in claim 1, which includes means for recirculating the gas for repeated impingement against the containers.

3. An apparatus, as defined in claim 2, which includes means disposed outside of said chamber for maintaining said gas above said predetermined sterilizing temperature.

4. An apparatus for heating articles such as containers to a predetermined sterilizing temperature comprising means providing an elongated chamber, means for conveying containers to be sterilized through said chamber, sterilizing gas manifold means having a relatively large cross sectional area as compared with said chamber and disposed adjacent to and extending for a substantial length of said chamber, restricted orifice means having a cross sectional area substantially less than said cross sectional area of said manifold means and disposed between said manifold means and said chamber and substantially continuously along a substantial length of said chamber for directing sterilizing gas against containers being conveyed through the chamber, and means for delivering a large mass of heated sterilizing gas to said manifold means, forcing said sterilizing gas through said orifice means and against said containers at a high velocity, and for withdrawing the sterilizing gas from said chamber and recirculating the sterilizing gas to said manifold means.

5. An apparatus for heating articles such as containers to a predetermined sterilizing temperature comprising means providing a chamber, means for conveying containers to be sterilized through said chamber, restricted orifice means disposed substantially continuously along a substantial length of said chamber for admitting sterilizing gas into said chamber and directing the gas against containers being conveyed through the chamber, duct means extending between said orifice means and a gas discharge opening in said chamber, means in said duct means for circulating a large mass of gas through said duct means and chamber and for forcing the gas through said orifice means and against said containers at a high velocity, and means associated with said duct means for maintaining said gas at a raised temperature such that the gas passing through said discharge opening for recirculation is at a temperature above said predetermined sterilizing temperature.

6. An apparatus for heating articles such as containers to a predetermined sterilizing temperature comprising chamber means, said chamber means including opposed wall portions mounted for endless motion for retaining containers therebetween and conveying the containers through the chamber means, one of said wall portions having orifice means therein for directing sterilizing gas against the containers, elongated gas manifold means disposed along said chamber, said one wall portion also providing a wall portion of said manifold means, and means for delivering a large mass of heated sterilizing gas into said manifold means and forcing the heated sterilizing gas through said orifice means and against said containers at a high velocity, and for withdrawing the sterilizing gas from said chamber means and recirculating the sterilizing gas.

7. An apparatus for heating articles such as containers to a predetermined sterilizing temperature comprising elongated chamber means, movably mounted endless means having one course disposed along one side of said chamber means for engagement with one end of containers to be sterilized, an opposite side of said chamber means including one course of movably mounted endless chain means disposed for engagement with an opposite end of containers to be sterilized, means for driving said endless means and said endless chain means in timed relationship to convey containers therebetween through said chamber means, said containers being disposed with open ends adjacent said endless chain means, said endless chain means including a series of means providing orifices for directing sterilizing gas into open ends of the containers and lateral passageways for directing gas from the containers into the interior of said chamber means, and means for delivering a large mass of heated sterilizing gas to said orifices and forcing the sterilizing gas through the orifices and against the containers at a high velocity and for withdrawing sterilizing gas from the chamber means and recirculating the sterilizing gas.

8. An apparatus, as defined in claim 7, which includes means for directing a portion of the delivered heated sterilizing gas through said one side of the chamber means and against exterior surfaces of said containers.

9. In an apparatus for heating articles to a predetermined processing temperature, the combination comprising elongated chamber means including one wall having fixed portions with a substantially continuous longitudinally extending slot therebetween, movably mounted endless chain means, one course of said endless chain means providing another portion of said one wall of said chamber means in alignment with said slot and being disposed for engagement with articles to be processed, fluid manifold means along said one wall and in open communication with said slot, said endless chain means having a series of restricted orifices therein aligned with said slot for directing a heated processing fluid from said manifold means against articles to be processed within said chamber means, and means for moving articles to be processed and said endless chain means substantially in unison to permit uninterrupted application of processing fluid through said orifices and against articles being processed.

10. An apparatus for heating articles to a predetermined processing temperature comprising means providing an elongated chamber, means providing an elongated fluid manifold along said chamber, means for conveying articles to be processed through said chamber, and orifice means providing at least a portion of partition means between said manifold means and said chamber and movable along said chamber for continuously directing a heated processing fluid directly from said manifold means against an article moving through the chamber.

11. In an apparatus for heating articles to a predetermined processing temperature, elongated processing chamber means through which articles to be processed may be conveyed, said chamber means having a first movable wall portion, a movably mounted endless chain including one course disposed for providing said first movable wall portion, said chamber means having a second movable wall portion disposed oppositely from said one course, movably mounted endless means having one course providing said second movable wall portion, said courses being disposed for retaining and conveying articles to be processed therebetween, fluid manifold means disposed along said chamber means, said one course of said endless chain also providing a portion of one wall of said manifold means, said endless chain having a series of orifices for directing processing fluid directly from said manifold means against articles being conveyed, and means adjacent said one course of said endless means for directing additional processing fluid against articles being conveyed.

12. An apparatus for heating articles such as containers to a predetermined sterilizing temperature comprising means providing a chamber, means for conveying articles to be sterilized through said chamber, and means for delivering a large mass of heated sterilizing gas to said chamber and for recirculating the gas, said last named means including a blower having an inlet connected with a gas discharge opening of the chamber, a burner, a mixing chamber, said blower and said burner having outlets connected with said mixing chamber so that gas from the blower will be mixed with and heated by gases from the burner, an elongated manifold along one side of said chamber and having one wall means common with said chamber, which wall means has substantially continuous longitudinally extending restricted slot means therein, means providing longitudinally extending orifice means communicating with said slot means for directing gas from said manifold against articles being conveyed through said chamber, and means connecting an outlet of said mixing chamber with an inlet of said manifold.

13. An apparatus, as defined in claim 12, wherein said blower outlet is connected substantially tangentially with said mixing chamber so as to promote swirling movement and intimate mixing of the gases within the mixing chamber.

14. An apparatus for heating articles such as containers to a predetermined sterilizing temperature comprising elongated chamber means, means for conveying containers to be sterilized through said chamber means, elongated manifold means disposed along opposite sides of said chamber, means providing substantially continuous elongated slot-like orifice between one of said manifold means and one of said sides of the chamber for directing sterilizing gas into the interior of containers being conveyed through said chamber, means providing a plurality of substantially continuous elongated slot-like orifices between said other manifold means and the other of said chamber side for directing sterilizing gas against exterior surfaces of containers being conveyed through the chamber, and means for delivering a large mass of heated sterilizing gas to said manifold means and forcing the gas through said orifices and against said containers at a high velocity and for withdrawing the gas from said chamber and recirculating the gas.

15. The method of sterilizing articles such as containers which method comprises moving the containers through chamber means along a predetermined path of travel, heating a large mass of gas to a temperature only a few degrees above a predetermined sterilizing temperature, confining and applying a pressure head to the heated gas, restricting egress of the heated gas adjacent and along a substantial portion of the path of travel of the containers moving through the chamber means, and impinging a large mass of the heated gas issuing under such restricted egress at a high velocity against the interior surfaces of the containers to be sterilized throughout a substantial portion of the path of travel of the containers including the entering end of the path of travel of the containers through the chamber means to thereby rapidly heat the containers substantially uniformly to the predetermined sterilizing temperature.

References Cited in the file of this patent

UNITED STATES PATENTS

| | | |
|---|---|---|
| 880,713 | Blair | Mar. 3, 1908 |
| 976,001 | Schmitt | Nov. 15, 1910 |
| 1,059,544 | Kiefer | Apr. 22, 1913 |
| 1,370,798 | Dunkley | July 2, 1918 |
| 1,309,785 | Taylor | July 15, 1919 |
| 1,652,654 | Wolfinger | Dec. 13, 1927 |
| 1,737,938 | Miller | Dec. 3, 1929 |
| 1,779,152 | Wheeler | Oct. 21, 1930 |
| 1,853,335 | Cook | Apr. 12, 1932 |
| 2,021,292 | Cook | Nov. 19, 1935 |
| 2,346,310 | Jensen | Apr. 11, 1944 |
| 2,660,513 | Ball | Nov. 24, 1953 |

FOREIGN PATENTS

| | | |
|---|---|---|
| 541,897 | France | May 9, 1922 |